(12) United States Patent  
Taibi et al.

(10) Patent No.: US 8,374,772 B2
(45) Date of Patent: Feb. 12, 2013

(54) MISFIRE DETECTION THROUGH COMBUSTION PRESSURE SENSOR

(75) Inventors: Cristian Taibi, Turin (IT); Alessandro Catanese, Orbassano (IT); Luca Fossati, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 392 days.

(21) Appl. No.: 12/835,539

(22) Filed: Jul. 13, 2010

(65) Prior Publication Data

US 2011/0040475 A1     Feb. 17, 2011

(30) Foreign Application Priority Data

Jul. 17, 2009   (GB) .................................. 0912428.0

(51) Int. Cl.
*G01M 15/08*     (2006.01)
*G01M 15/11*     (2006.01)

(52) U.S. Cl. ..... 701/105; 701/111; 701/114; 73/114.02; 73/114.16; 123/435; 123/406.14; 123/406.27; 123/406.41

(58) Field of Classification Search ............. 701/105, 701/111, 114; 73/114.02, 114.11, 114.16; 123/406.14, 406.27, 406.41, 435
See application file for complete search history.

(56) References Cited

U.S. PATENT DOCUMENTS

| | | | | |
|---|---|---|---|---|
| 4,622,939 A * | 11/1986 | Matekunas | ............ | 123/406.41 |
| 5,076,098 A | 12/1991 | Miwa | | |
| 5,878,717 A * | 3/1999 | Zur Loye | ...................... | 123/435 |
| 7,073,485 B2 * | 7/2006 | Truscott et al. | .......... | 123/406.22 |
| 7,117,082 B2 * | 10/2006 | Kohira et al. | ................. | 701/114 |
| 7,454,286 B2 * | 11/2008 | Sinnamon et al. | ............ | 701/110 |
| 7,542,865 B2 * | 6/2009 | Hoshi et al. | ................... | 702/106 |

* cited by examiner

*Primary Examiner* — Erick Solis
(74) *Attorney, Agent, or Firm* — Ingrassia Fisher & Lorenz, P.C.

(57) ABSTRACT

A method is provided for controlling an internal combustion engine. The method includes, but is not limited to the step of measuring in-cylinder pressure of an expansion phase of a combustion cycle of a cylinder of the internal combustion engine and measuring in-cylinder pressure of a compression phase of the combustion cycle of the cylinder of the internal combustion engine. A difference between a polytrophic expansion phase constant of the cylinder of the internal combustion engine and a polytrophic compression phase constant of the cylinder of the internal combustion engine is then determined using the measured expansion phase pressure and the measured compression phase pressure. A misfiring of the cylinder is later detected using the determined difference.

22 Claims, 15 Drawing Sheets

MISFIRE DETECTION THROUGH COMBUSTION PRESSURE SENSOR

CROSS-REFERENCE TO RELATED APPLICATION

This application claims priority to British Patent Application No. 091248.0, filed Jul. 17, 2009, which is incorporated herein by reference in its entirety.

TECHNICAL FIELD

This application relates to firing of internal combustion engine, such as a diesel engine. In particular, it relates to detection of misfiring.

BACKGROUND

Misfiring detection of an internal combustion engine is often required for improving combustion control. When a cylinder of the engine is misfiring, un-burnt gas is exhausted from the engine. Consequently, harmful components in the exhaust gas are increased. This also results in lowering of engine power output and increasing pollution. Furthermore, if the combustion control is achieved in such a manner as to increase an intake air amount with a high step-response during infrequent engine misfiring, an idle speed of the engine can become unstable.

Therefore, the misfiring detection is required to determine when misfiring occurs so that various combustion conditions, such as ignition timing and amount of an intake air, can be controlled advantageously.

SUMMARY

An improved method is provided to determine an occurrence of misfiring based on in-cylinder pressure data. The method uses the in-cylinder pressure data to determine an occurrence of a misfiring event, on a cycle-by-cycle basis. On Board Diagnostics (OBD) or European On Board Diagnostics (EOBD) can use such misfiring information for engines that are equipped with in-cylinder pressure sensor and for close-loop combustion control to reduce misfire occurrence.

The misfiring detection compares polytrophic model for a compression-phase and a polytrophic model for an expansion-phase of a combustion cycle. A misfiring is detected when a difference between the calculated polytrophic expansion constant and the calculated compression constant is smaller than a threshold value. The threshold value can be calibrated, adjusted, or predetermined. In one embodiment, a misfiring is detected when the difference has a negative value.

A misfiring is detected when the calculated polytrophic expansion constant is smaller than the calculated compression constant. This criterion provides a balance approach that is robust towards noise and mounting error of a crankshaft wheel.

On the one hand, a misfiring detection that is based on only one pressure sample would be too sensitive to noise. On the other hand, a misfiring detection that is based on global parameters, which are representative of all pressure curves, is too sensitive to mounting errors on crankshaft wheel.

This method has the advantage of enabling diagnosis of engine performance and it can be used by an On-Board Diagnostic system.

A method is provided for controlling an internal combustion engine. The method comprises the step of measuring in-cylinder pressure of an expansion phase of a combustion cycle of a cylinder of the internal combustion engine. The internal combustion engine can use pressure ignition or spark ignition. The method also includes the step of measuring in-cylinder pressure of a compression phase of the combustion cycle of the cylinder of the internal combustion engine.

A difference between a polytrophic expansion phase constant of the cylinder of the internal combustion engine and a polytrophic compression phase constant of the cylinder of the internal combustion engine is then determined using the measured expansion phase pressure and the measured compression phase pressure. After this, a misfiring of the cylinder is detected using the determined difference. A misfiring can be deemed to occur when the determined difference is smaller than a threshold value that can be calibrated, adjusted, or predetermined. In one aspect of the application, the threshold value is zero.

The expansion phase pressure and the compression phase pressure can be measured over a pre-determined angular window when the in-cylinder pressure is moderate. The pressure of the expansion phase is measured after a major part of combustion has occurred. This has the benefit of eliminating or reducing influences of the polytrophic expansion phase constant and the polytrophic compression phase constant by combustion.

The internal combustion engine can then be controlled using the detected misfiring to eliminate the detected misfiring. The timing of fuel injection and amount of injected fuel can be adjusted to eliminate or to reduce the misfiring. The amount of injected fuel also comprises amount of air to fuel composition and quantity.

An opening and closing of a fuel injector of the cylinder can be adjusted for controlling the internal combustion engine. The opening and closing of fuel injector can also includes adjustment of input and output valves opening and closing timing. In certain case, this also includes adjustment of sparking ignition timing.

An engine control unit is also provided in accordance with an embodiment of the invention. The engine control unit includes a port, a storage unit, and a misfiring detection unit.

Functionally, the port receives an in-cylinder pressure measurement of a cylinder of an internal combustion engine. The storage unit stores the received in-cylinder pressure measurement of an expansion phase of the combustion cycle of the cylinder of the internal combustion engine as well as the in-cylinder pressure measurement of a compression phase of the combustion cycle of the cylinder of the internal combustion engine.

The misfiring detection unit determines a difference between a polytrophic expansion phase constant and a polytrophic compression phase constant. In particular, the polytrophic expansion phase constant is determined using the expansion phase pressure measurement whilst the polytrophic compression phase constant polytrophic compression phase constant is determined using the compression phase pressure measurement. The misfiring detection unit uses the determined difference to detect engine misfiring. A misfiring can be considered detected when the determined difference is smaller than a threshold value that can be calibrated, adjusted, or predetermined.

The engine control unit can include a port for receiving engine phase information of the combustion cycle of the cylinder of the internal combustion engine. This engine phase information is used to determine or to detect its particular engine phase or state for measuring the in-cylinder pressure.

The engine phase information can comprise crankshaft angular position information and camshaft angular position information. Put differently, the engine combustion phase can be determined based on the crankshaft angular position information and camshaft angular position information. In a generic sense, other information can also be used to determine the engine phase information.

The engine control unit can comprise a cylinder control unit for controlling a run-time parameter unit of the cylinder of the internal combustion engine using the detected engine misfiring.

The run-time parameter can comprise a timing of fuel injection. The fuel injection can further include amount of injected fuel. Further, the run-time parameter unit can comprise a fuel injection unit for releasing fuel into the cylinder.

The engine control unit can include a port for receiving one or more engine parameters. The engine parameter can be related to engine temperature information or to engine speed information. The cylinder control unit can adjust the run-time parameter using the received engine parameter.

An internal combustion engine and a vehicle are also provided in accordance with embodiments of the invention. The internal combustion engine includes the above-mentioned engine control unit, one or more cylinders, and a run-time parameter unit. The cylinder comprises an in-cylinder pressure sensor unit for transmitting an in-cylinder pressure measurement to the engine control unit whilst the run-time parameter unit is provided in the cylinder wherein the run-time parameter unit is controlled by the engine control unit.

In most implementations, the engine control unit can control the fuel injection via using a valve of a fuel line of the internal combustion engine. The engine control unit can also control the fuel injection via using a fuel-rail pressure regulator of the fuel line of the internal combustion engine.

The vehicle includes the above-mentioned internal combustion engine and one or more wheels that are connected to the internal combustion engine via a transmission unit. The transmission unit includes gears and one or more clutches for transmitting rotational forces of the internal combustion engine to the wheels.

BRIEF DESCRIPTION OF THE DRAWINGS

The present invention will hereinafter be described in conjunction with the following drawing figures, wherein like numerals denote like elements.

FIG. 1 illustrates a graph of polytrophic constant difference of an engine that is idling or not misfiring and a graph of polytrophic constants difference of the engine that is misfiring, FIG. 2 illustrates a graph of polytrophic constant difference of the engine for FIG. 1 with a +3 degree crankshaft wheel error wherein the engine is misfiring;

FIG. 3 illustrates a graph of polytrophic constant difference of the engine for FIG. 1 with a −5 degree crankshaft wheel error wherein the engine is idling;

FIG. 4 illustrates a graph of sum of pressure ratios of the engine for FIG. 1 with +3 degree crankshaft wheel error wherein the engine is misfiring;

FIG. 5 illustrates a graph of sum of pressure ratios of the engine for FIG. 1 with −4 degree crankshaft wheel error wherein the engine is idling;

FIG. 6 illustrates a graph of IMEP of the engine for FIG. 1 that is misfiring with +3 degree crankshaft wheel error wherein the engine is misfiring;

FIG. 7 illustrates a graph of IMEP (Indicated Mean Effective Pressure) of the engine for FIG. 1 with −5 degree crankshaft wheel error wherein the engine is idling;

DETAILED DESCRIPTION

The following detailed description is merely exemplary in nature and is not intended to limit application and uses. Furthermore, there is no intention to be bound by any theory presented in the preceding background or summary or the following detailed description.

FIG. 1 to FIG. 7 are analyzes criteria or parameters at engine idle conditions because they represent borderline conditions for misfire. The idle conditions represent a minimum operating speed of the engine. For a passenger-car engine, the idle speed is customarily between 600 rpm (revolution per minute) and 1,000 rpm.

Small crankshaft-wheel position errors are simulated in the embodiments of FIG. 1 to FIG. 7 to determine which parameters provide reliable indication of misfiring. On the one hand, positive errors of the crankshaft would cause some non-detection of misfiring events. For the positive errors, a Top Dead Centre is recognized too late, wherein the Top Dead Centre refers to a position of a piston wherein the piston is farthest from its crankshaft. On the other hand, negative errors of the crankshaft would cause some wrong detection of misfiring events. For the negative errors, the Top Dead Centre is recognized too early.

Figure 1:
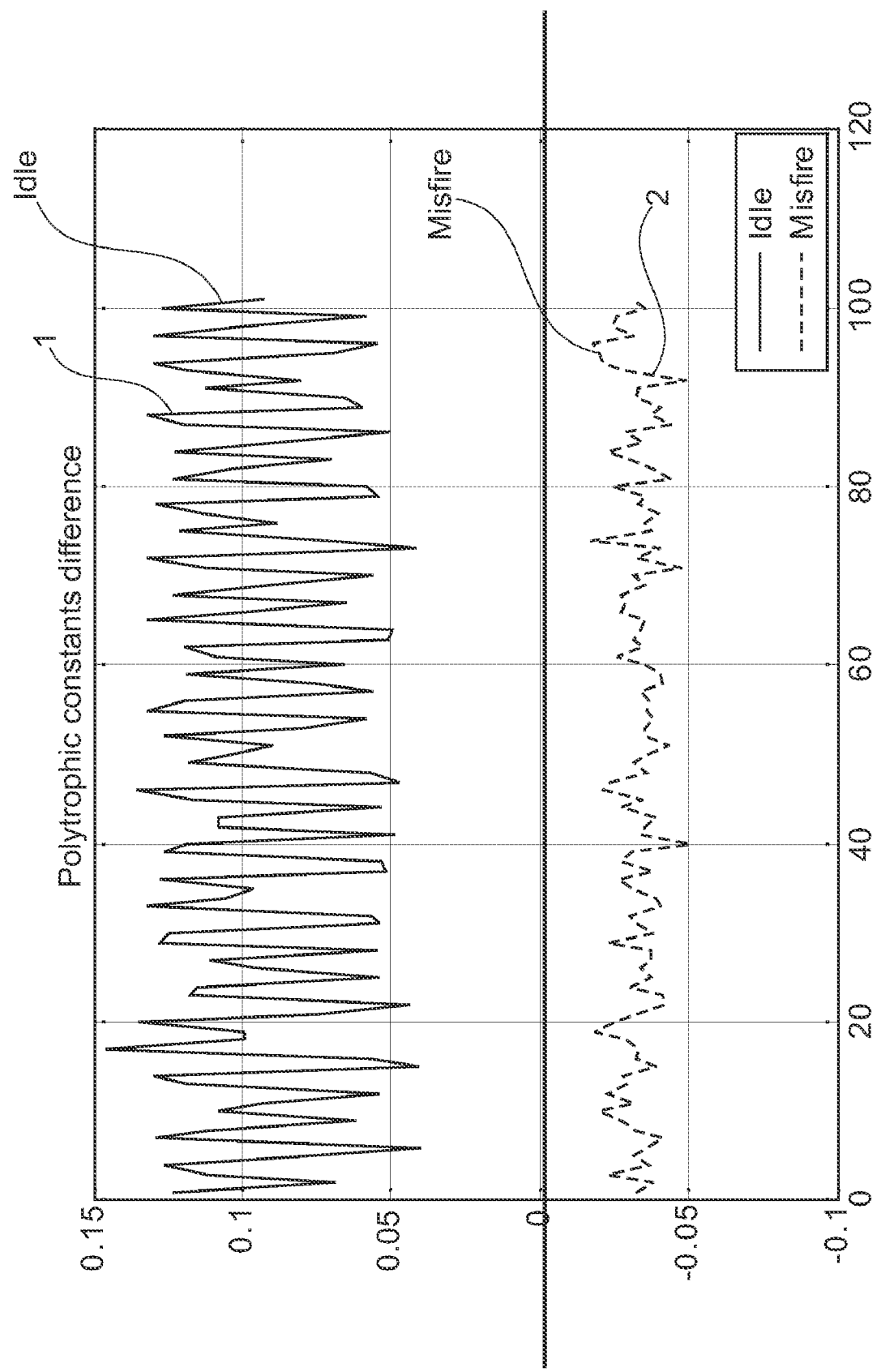
FIG. 1 to FIG. 3 illustrate a first embodiment to determine engine misfiring using polytrophic constant difference of an engine.
Figure 2:
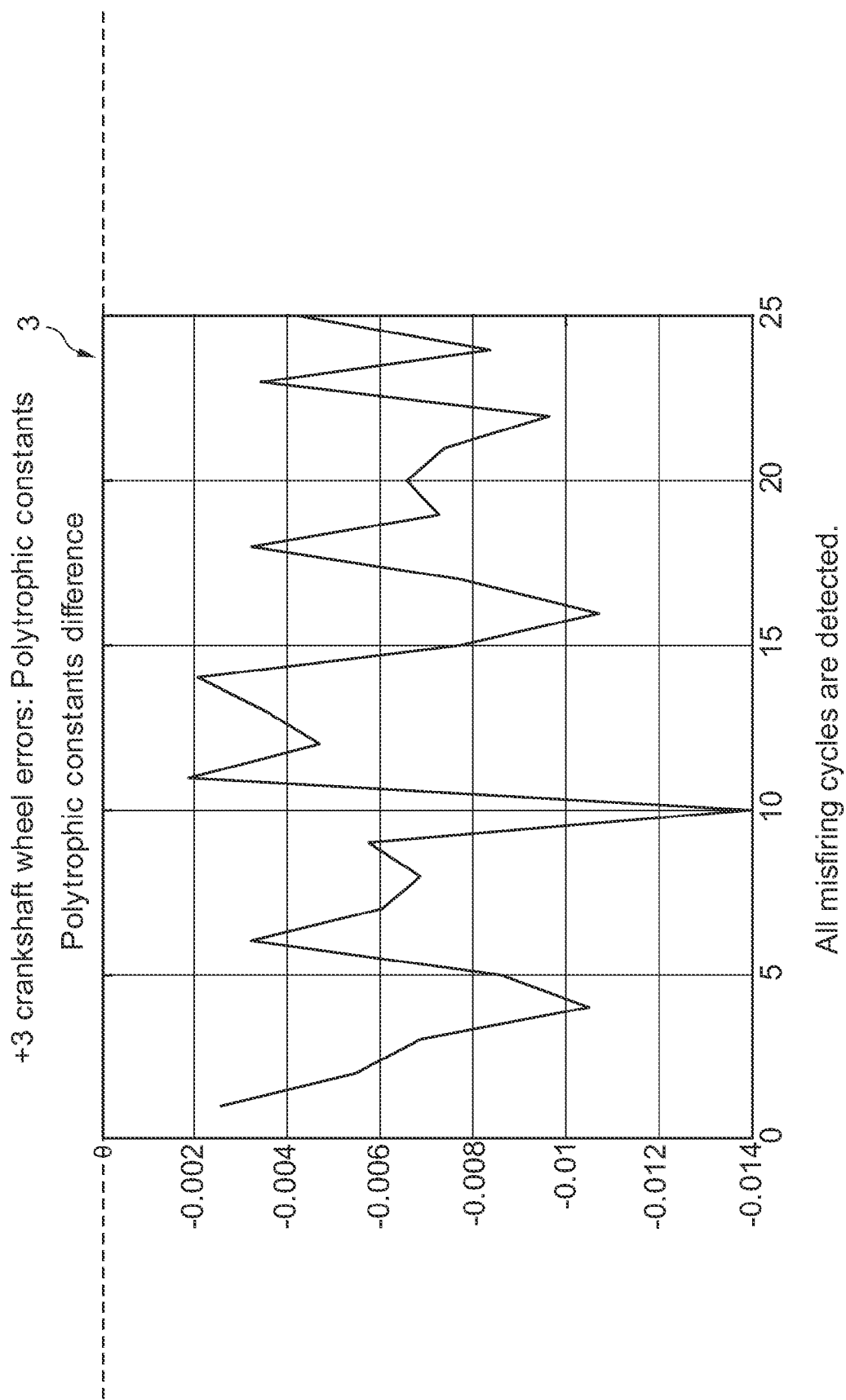
Figure 3:
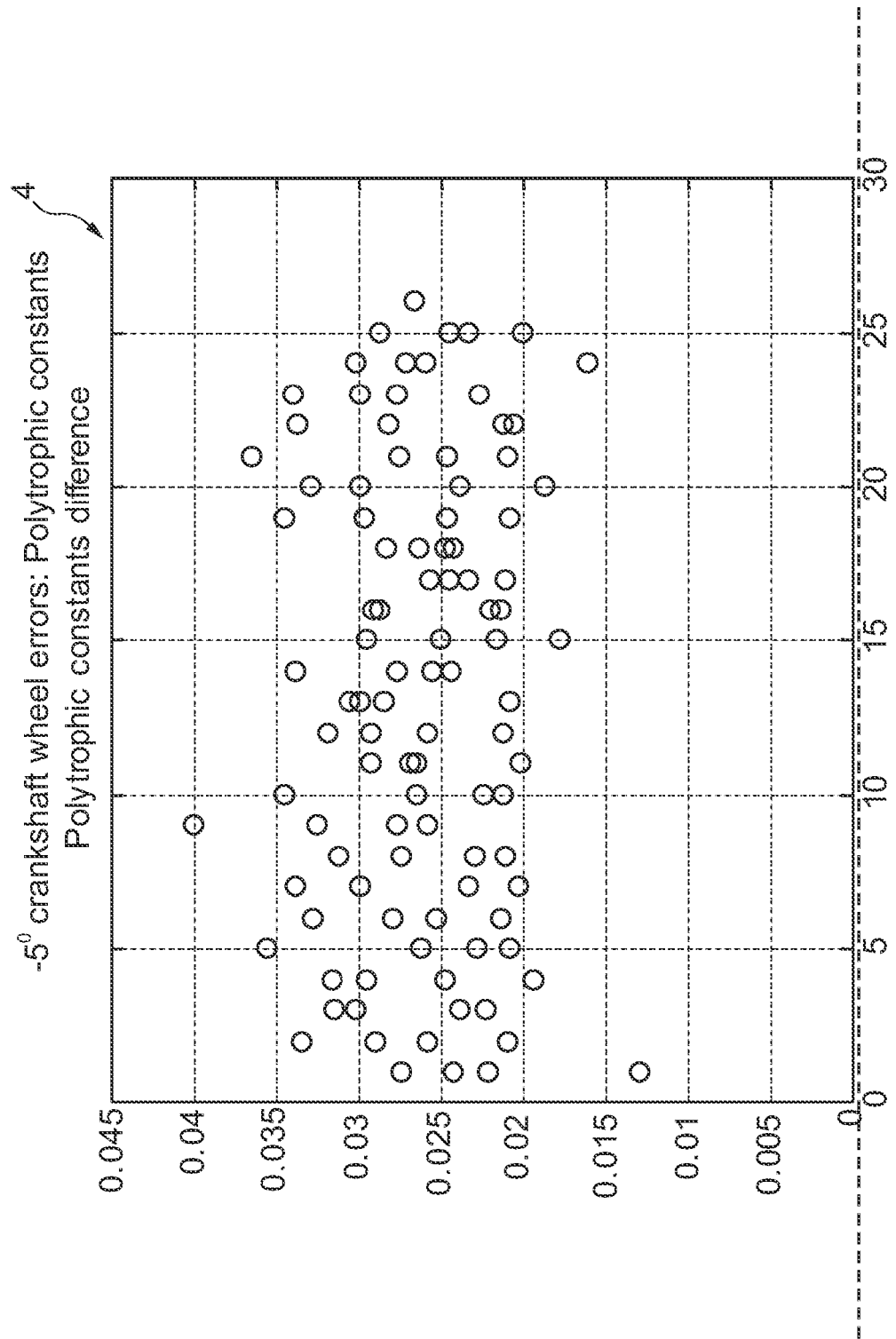

FIG. 1 to FIG. 3 show a first embodiment to determine engine misfiring using a parameter of polytrophic constant difference of a cylinder of an engine. The polytrophic constant is also called a polytropic constant.

The embodiment of FIG. 1 to FIG. 3 is based on the polytrophic model during compression and expansion phases. During the compression phase, the polytrophic law is expressed as:

$$p_i V_i^{Kc} = C_i \quad (1)$$

Where $p_i$ represents in-cylinder pressure at a given crankshaft angle, $V_i$ represents cylinder volume at the given crankshaft angle, $K_c$ represents polytrophic compression exponent, and $C_i$ represents the polytrophic compression constant at the given crankshaft angle.

Figure 14:
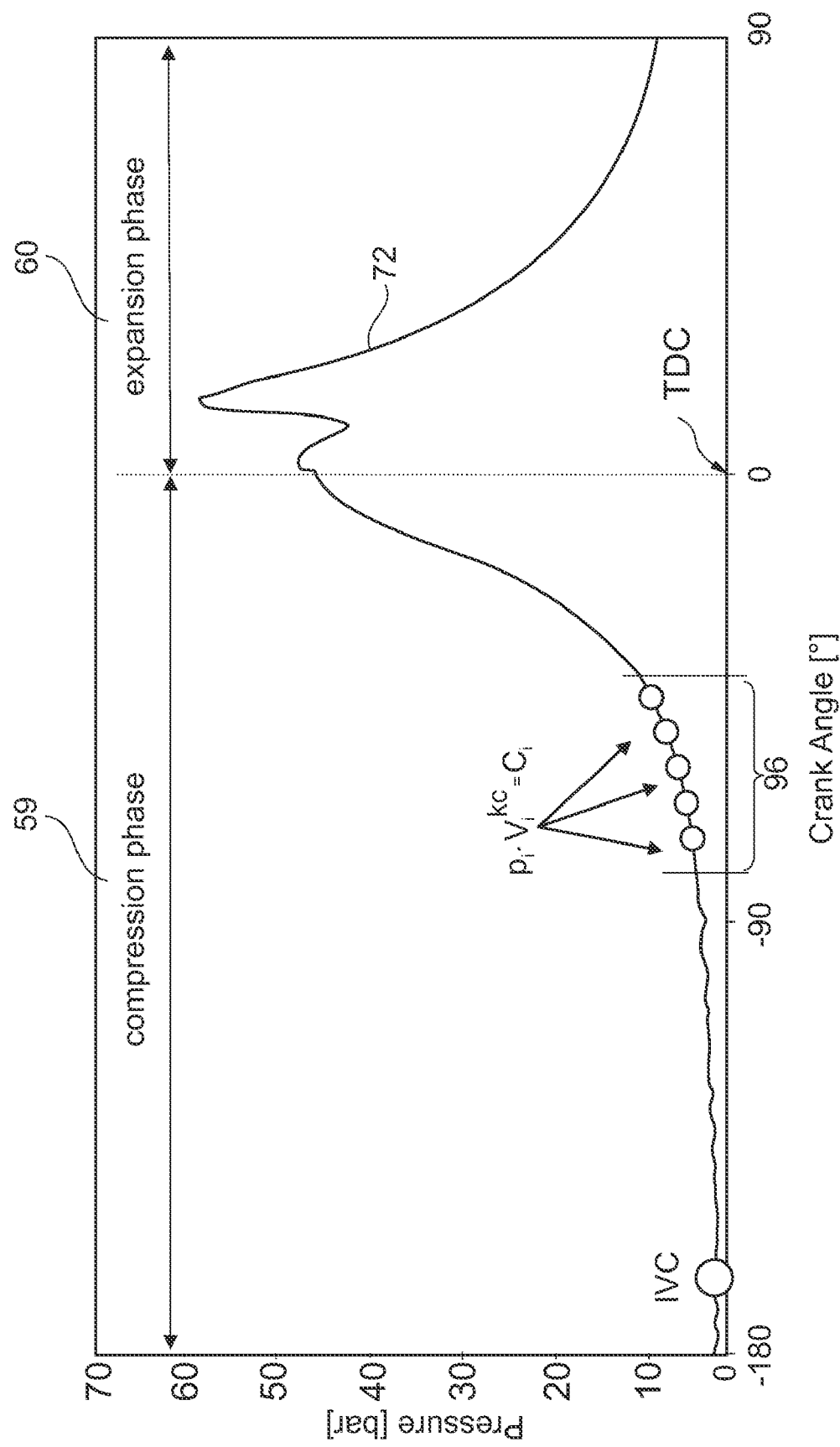
FIG. 14 illustrates a determination of polytrophic compression constant of the engine for FIG. 1.

A polytrophic compression constant (C_compr) is then determined as an average of a number of $C_i$ values. The number of $C_i$ values can be adjusted or be configured. The $C_i$ values are calculated for a pressure curve of one combustion cycle within a configurable angular window 96 in which only compression and no combustion is present, as shown in FIG. 14.

In the similar way, during expansion phase the following polytrophic law is expressed as:

$$p_i V_i^{Ke} = C_i \qquad (2)$$

Where $p_i$ represents in-cylinder pressure at a given crankshaft angle, $V_i$ represents cylinder volume at the given crankshaft angle, $K_e$ represents polytrophic expansion exponent, and $C_i$ represents the polytrophic compression constant at the given crankshaft angle.

Figure 15:
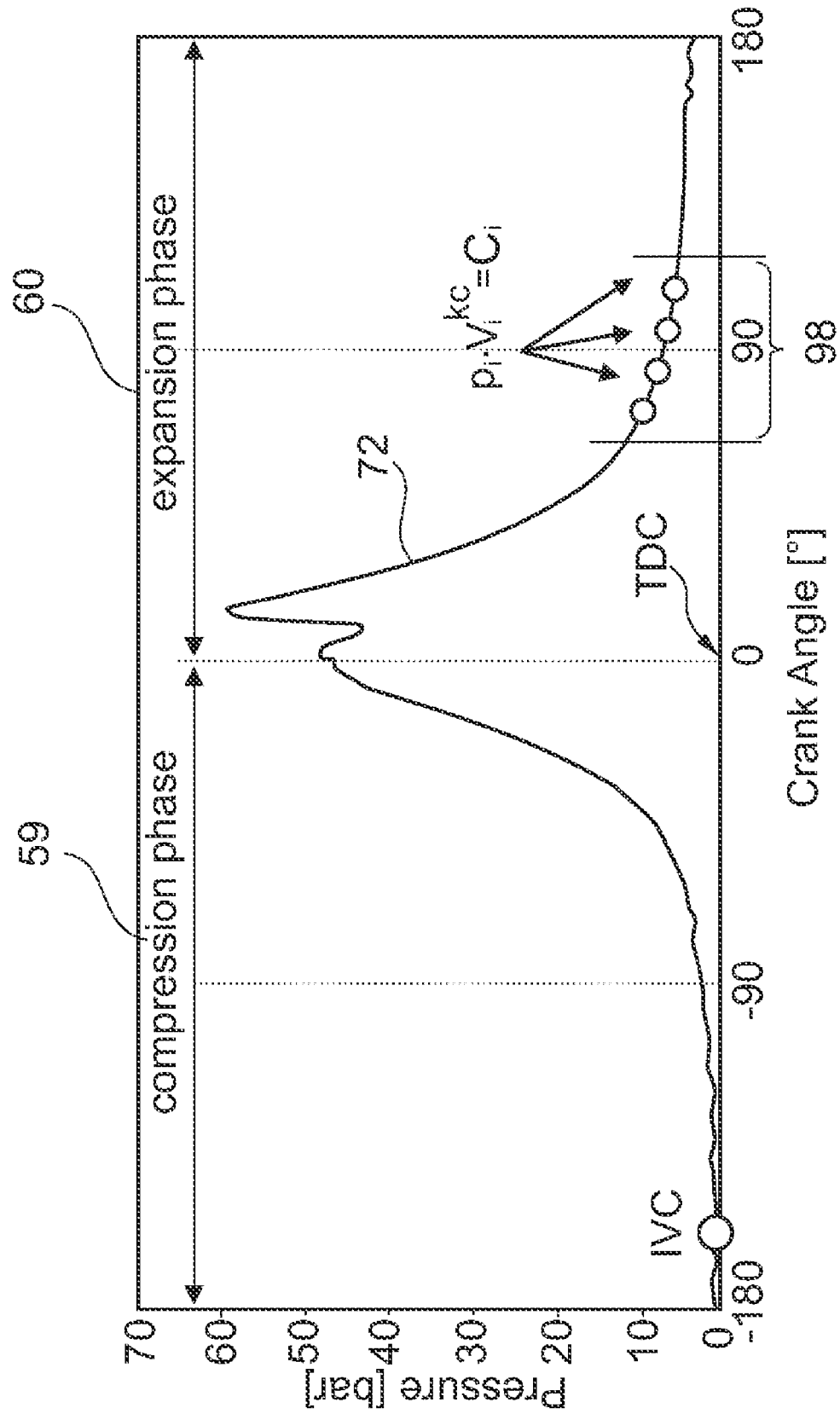
FIG. 15 illustrates a determination of polytrophic expansion constant of the engine for FIG. 1.

Similar to the polytrophic compression constant, the polytrophic expansion constant (C_exp) is determined as an average of a configurable number of $C_i$ values that are calculated for a pressure curve of one combustion cycle within a configurable angular window 98 in which expansion occurs, as depicted in FIG. 15.

Once both polytrophic constants are calculated, they are compared to estimate or to determine if a misfiring cycle has occurred. In particular, when a difference between the polytrophic expansion and the compression constants is smaller than a configurable parameter a misfire event is considered to have happened, according to the following formula:

$$C\_exp - C\_compr < Threshold \qquad (3)$$

When combustion is not occurring, the compression and the expansion polytrophic constants are equal in an ideal case of compression and expansion. In this case, no heat exchange or air leakage occurs. In practice, some thermodynamic losses are present. Hence, the threshold serves as a configurable parameter to comprehend for thermodynamic losses for misfire determination.

Put differently, the polytrophic constant difference relates to a difference between a polytrophic expansion constant and a polytrophic compression constant. In particular, the constants are calculated over a limited angular window for each combustion cycle or each positive injection cycle in which pressure level is moderate. The constants are not calculated during engine over-run, wherein a vehicle of the engine is moving with no throttle and the engine is acting as a brake.

In a special case, the polytrophic constant difference with positive values is deemed to indicate that the engine is firing normally whilst the polytrophic constant difference with negative values is deemed to indicate that the engine is misfiring. In a generic sense, the polytrophic constant difference that is smaller than a threshold value can be deemed to indicate that the engine is misfiring. The threshold value can be calibrated, adjusted, or predetermined.

FIG. 1 shows a graph 1 of polytrophic constant difference of a cylinder of an engine that is idling or is not misfiring and a graph 2 of polytrophic constants difference of the cylinder of the engine that is misfiring. The engine has four cylinders engine. Three of the four cylinders are experiencing combustion at idle conditions and one of the four cylinders is experiencing misfire. The graph 1 has data points that have positive values, which range from about 0.04 to about 0.15. Thus, these data points correctly indicate normal engine firing since these data points of graph A has positive values. In contrast, the graph 2 has data points that have negative values, which range from about −0.02 to about −0.05. These data points correctly indicate engine misfiring as the data points of graph B has negative values.

FIG. 2 depicts a graph 3 of polytrophic constant difference of the engine for FIG. 1 that is misfiring. In this case, the engine has a +3 degree crankshaft wheel error. The graph 3 has data points that have negative values, which range from about −0.002 to about −0.014. Again, these data-points correctly indicate engine misfiring, even though its crankshaft has a positive wheel error.

FIG. 3 shows a graph 4 of polytrophic constant difference of the engine for FIG. 1 that is firing normally. The engine, in this case, has a −5 degree crankshaft wheel error. The graph 4 has data-points with positive values that range from about 0.013 to about 0.04. The data points indicate normal combustion cycles, even though the crankshaft has a negative wheel error.

In short, the embodiment of FIG. 1 to FIG. 3 shows that the polytrophic constant difference parameter has the advantage that it does not represent local events that occur occasionally but represent events that occur with every engine combustion cycle. Events that occur occasionally are not useful for detecting engine misfiring.

The polytrophic constant difference parameter does not provide false results as shown in FIG. 1 to FIG. 3. Further, the polytrophic constant difference parameter is robust or is resistant towards noise and crankshaft-wheel position errors. In other words, noise and crankshaft-wheel position errors affect the polytrophic constant difference parameter less than other criteria.

Figure 4:
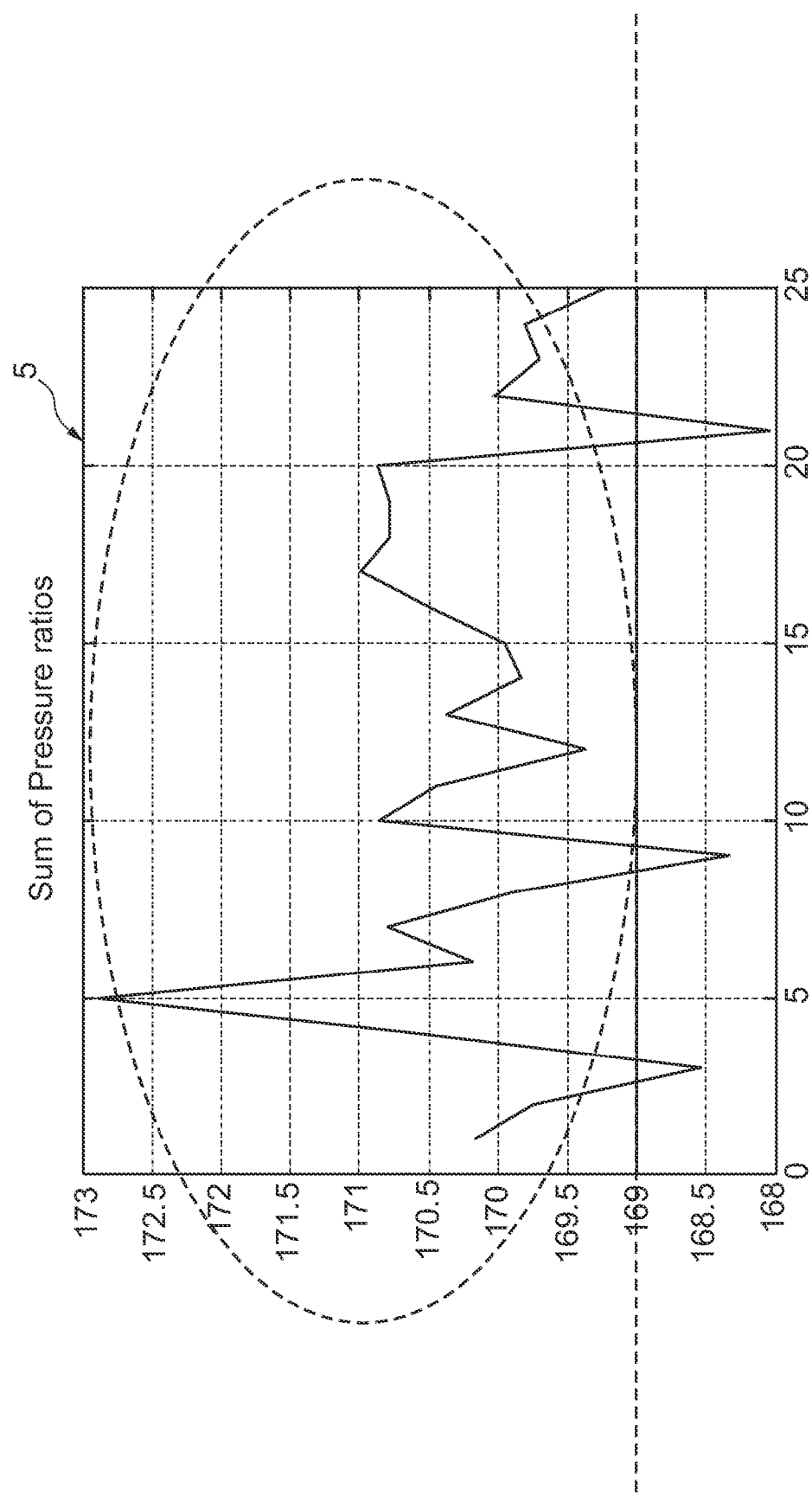
FIG. 4 and FIG. 5 illustrate a second embodiment to determine engine misfiring using sum of pressure ratios of the engine.
Figure 5:
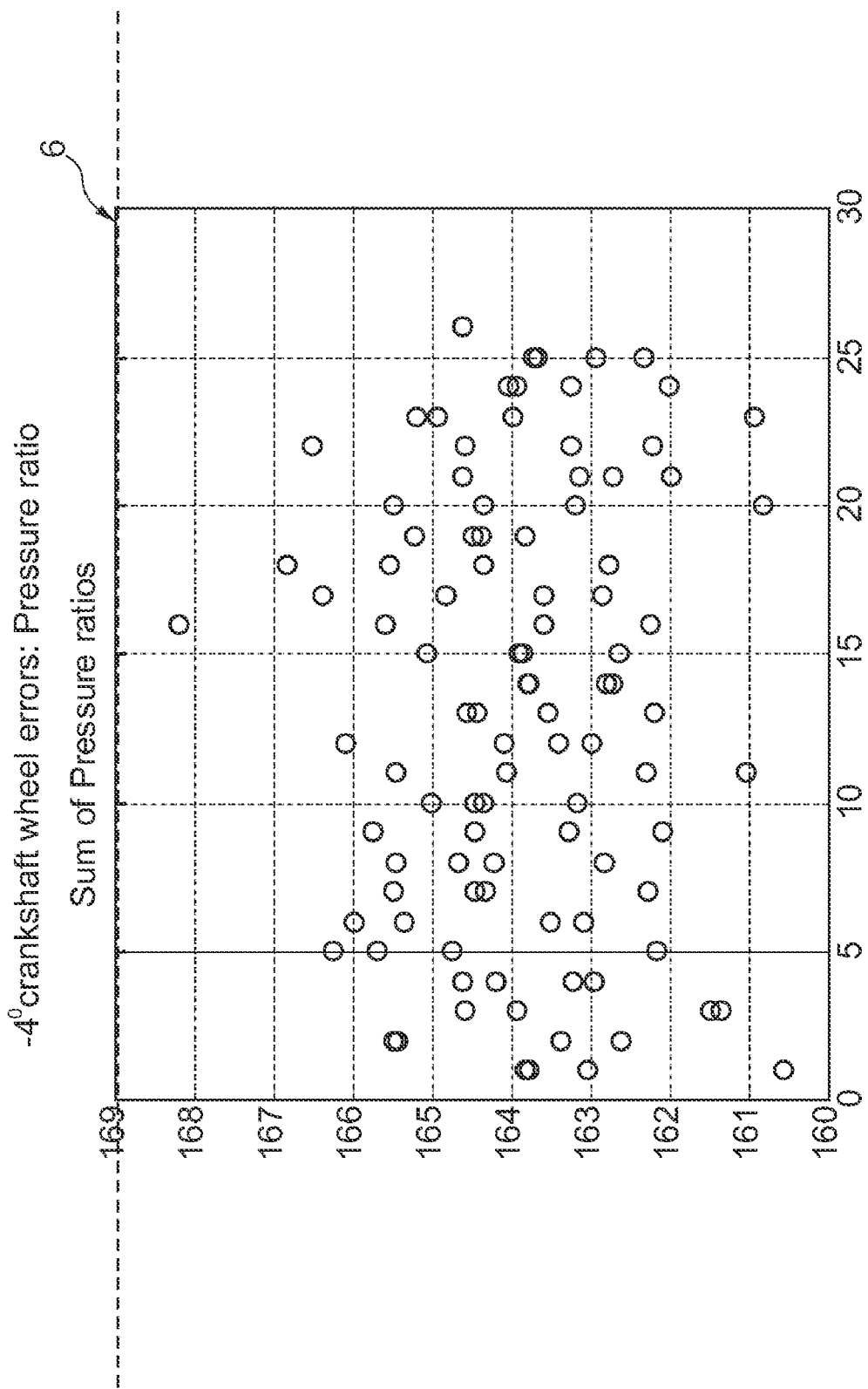

FIG. 4 and FIG. 5 show a second embodiment to determine engine misfiring using a parameter of a sum of pressure ratios of the cylinder of the engine.

In this embodiment, the sum of pressure ratio $P_R(\theta)$ along a combustion cycle is defined as:

$$P_R(\theta) = P_{cyl}(\theta) / P_{mot}(\theta) \qquad (4)$$

Where $\theta$ represents crankshaft rotational angle, $P_{cyl}(\theta)$ represents fired pressure, which is pressure in combustion chamber when combustion is present, and $P_{mot}(\theta)$ represents motored pressure, that is pressure in the combustion chamber with no combustion and with the crankshaft turned by an outside agent.

In addition, for a polytrophic process, $P_{mot}(\theta)$ can be defined as:

$$P_{mot}(\theta) = P_{im}(V_{im}/V(\theta))^r \qquad (5)$$

Where r represents a real number or polytrophic index, $V(\theta)$ represents motored pressure chamber pressure with respect to a certain crankshaft rotational angle, and $V_{im}$ and $P_{im}$ represent constants.

The sum of pressure ratios with values that are more than a pre-determined value are deemed to indicate normal engine firing and values that are less than the pre-determined value are deemed to indicate engine misfiring. The pre-determined value as provided here is 169.

FIG. 4 shows a graph 5 of sum of pressure ratios of the engine for FIG. 1 with +3 degree crankshaft wheel error wherein the engine is misfiring. The graph 5 has data points that have values that range from about 168.0 to about 172.8. Hence, many data points of graph E indicate incorrectly normal combustion.

FIG. 5 depicts a graph 6 of sum of pressure ratios of the engine for FIG. 1 of normal combustion cycles. The engine, as provided here, has −4 degree crankshaft wheel error and is idling or is firing normally. The graph 6 has data points that have values that range from about 160.5 to about 168.2. Thus, these data-points indicate incorrectly misfiring.

Figure 6:
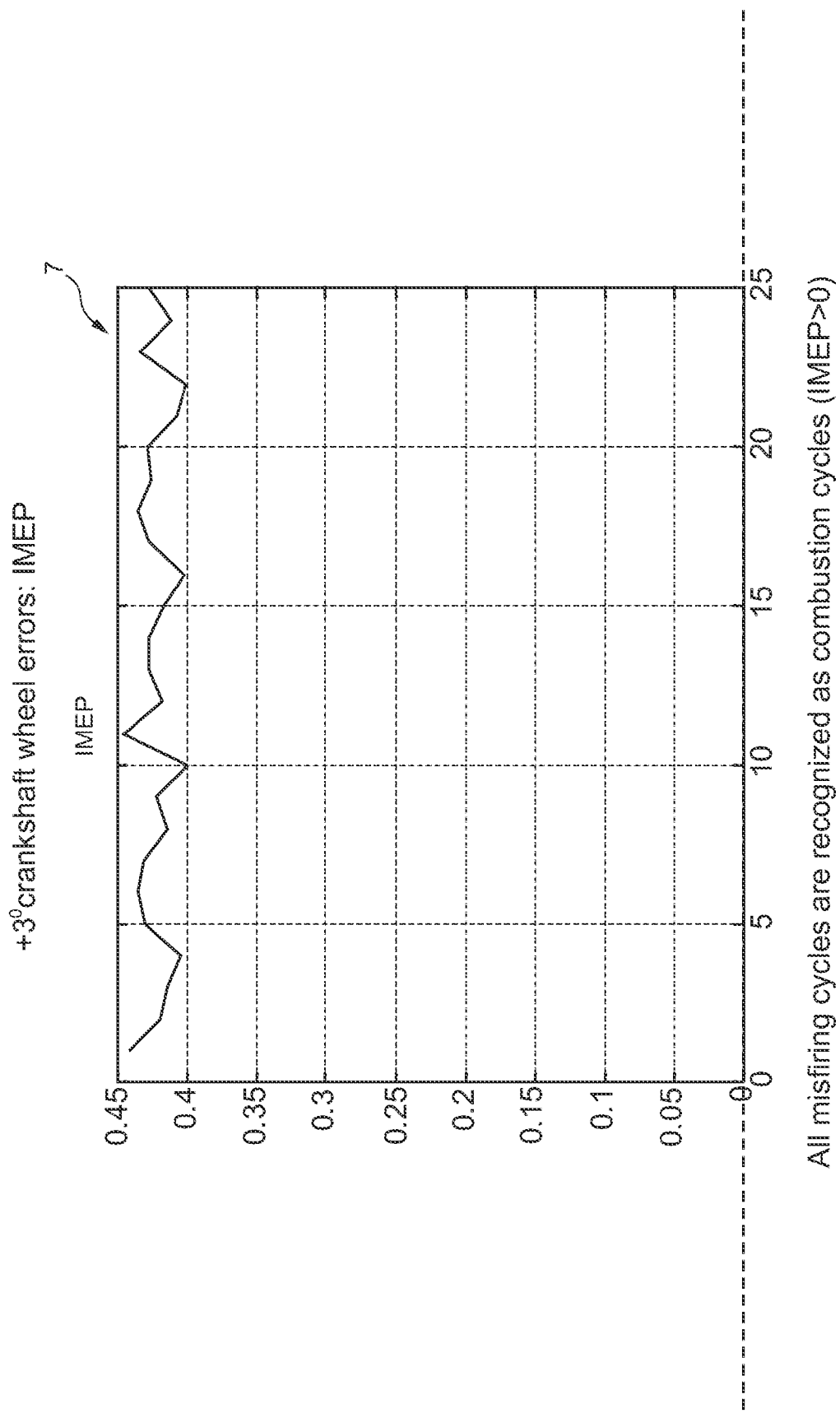
FIGS. 6 and 7 illustrate a third embodiment to determine engine misfiring using IMEP (Indicated Mean Effective Pressure)
Figure 7:
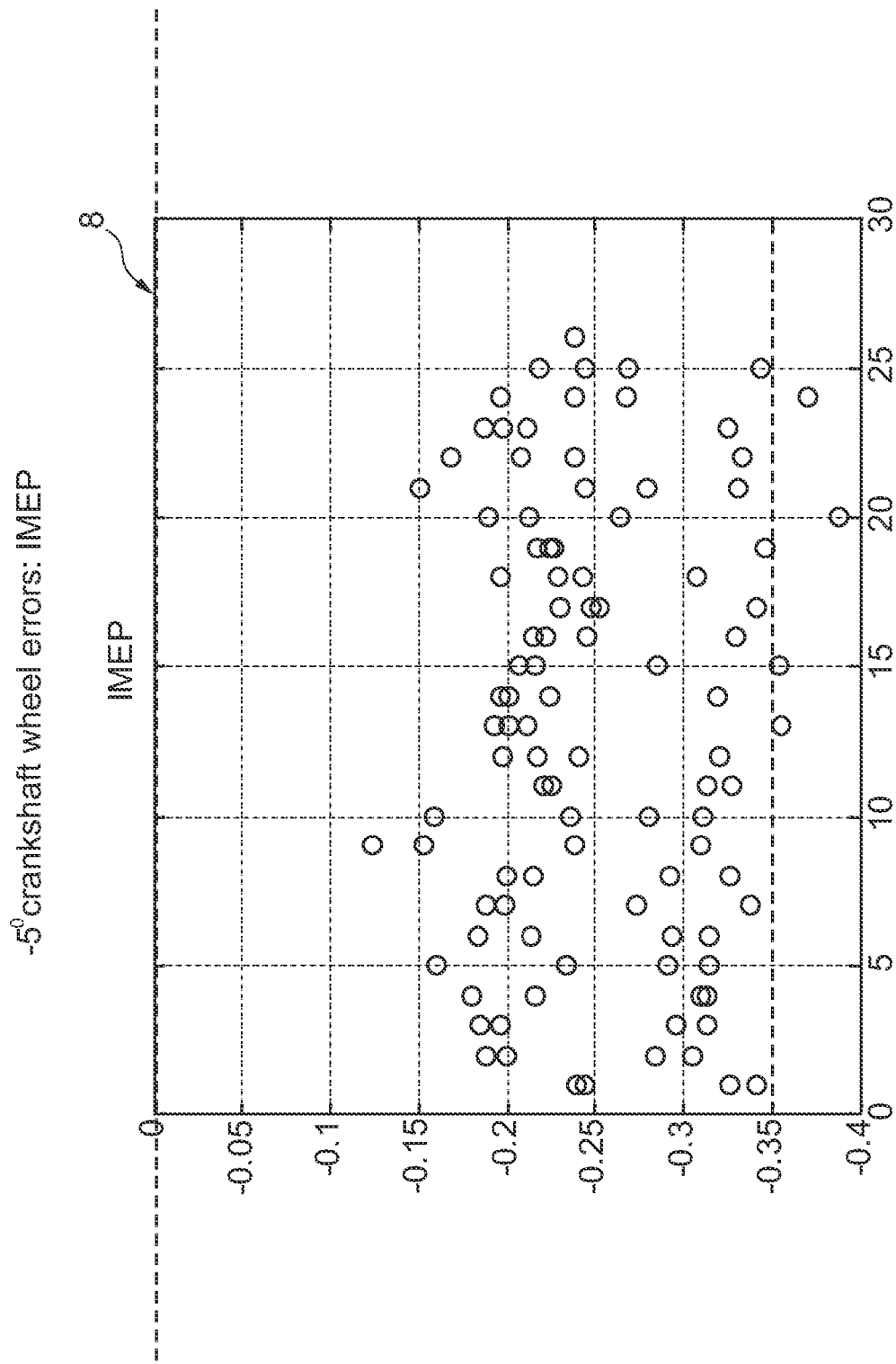

FIGS. 6 and 7 show a third embodiment to determine engine misfiring using a parameter of IMEP (Indicated Mean Effective Pressure) of the cylinder of the engine of FIG. 1.

In this embodiment, the IMEP is defined as:

$$IMEP = \int_{180}^{-180} P\, dV \qquad (6)$$

Where P represents chamber pressure and V represents chamber volume.

The IMEP with values that are more than a pre-determined value are deemed to indicate normal engine firing and values that are less than the pre-determined value are deemed to indicate engine misfiring. The pre-determined value, as provided here, is zero.

FIG. 6 shows a graph 7 of IMEP of the engine for FIG. 1 that is misfiring. The engine, in this case, has +3 degree crankshaft wheel error. The graph 7 has data points with positive values, which range from about 0.40 to about 0.45. The data points, as based on IMEP criteria, indicate incorrectly normal engine firing.

FIG. 7 depicts a graph 8 of IMEP of the engine for FIG. 1 that is firing normally. In this case, the engine has a −5 degree crankshaft wheel error. The graph 8 has data points with negative values, which range from about −0.40 to about −0.17. These data points, as based on IMEP criteria, indicate incorrectly engine misfiring.

In short, the embodiment of FIG. 1 to FIG. 3 shows that the parameter of polytrophic constant difference criterion is robust against small crankshaft wheel errors. This parameter of polytrophic constant difference does not detect a misfire when the misfire is not present and does not detect a misfire when the misfire is present. This is unlike the embodiments of FIG. 4 to FIG. 7 that show parameter of sum of pressure ratios and the parameter of IMEP, which does not provide reliable indications.

Figure 8:
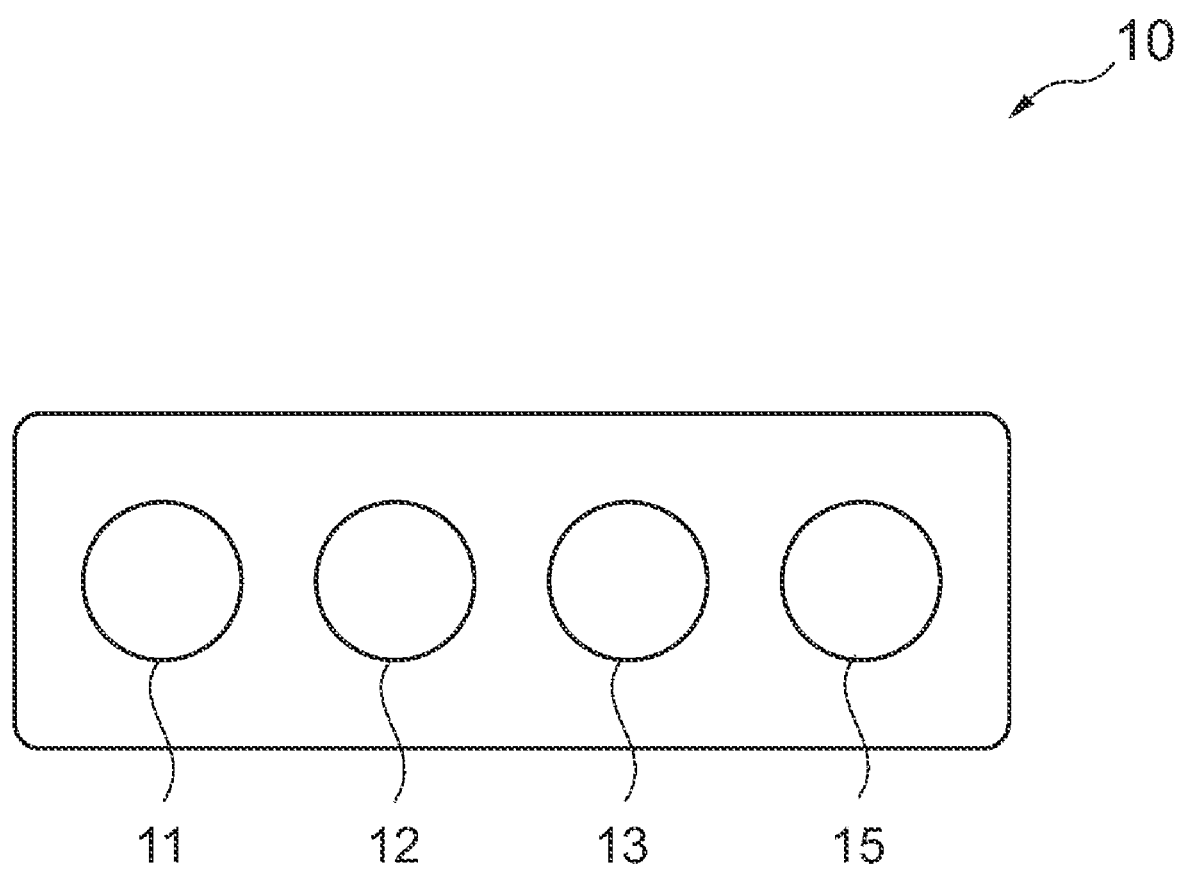
FIG. 8 illustrates the engine for FIG. 1 that comprises a plurality of cylinders.

FIG. 8 depicts a compression ignition engine 10 for a vehicle that comprises a plurality of combustion cylinders 11, 12, 13, and 15. The engine 10 is intended for driving or for turning wheels of the vehicle to transport goods or passengers. The cylinders 11, 12, 13, and 15 are used to convert diesel fuel to kinetic energy. The cylinders 11, 12, 13, and 15 are similar to each other and have similar parts.

Figure 9:
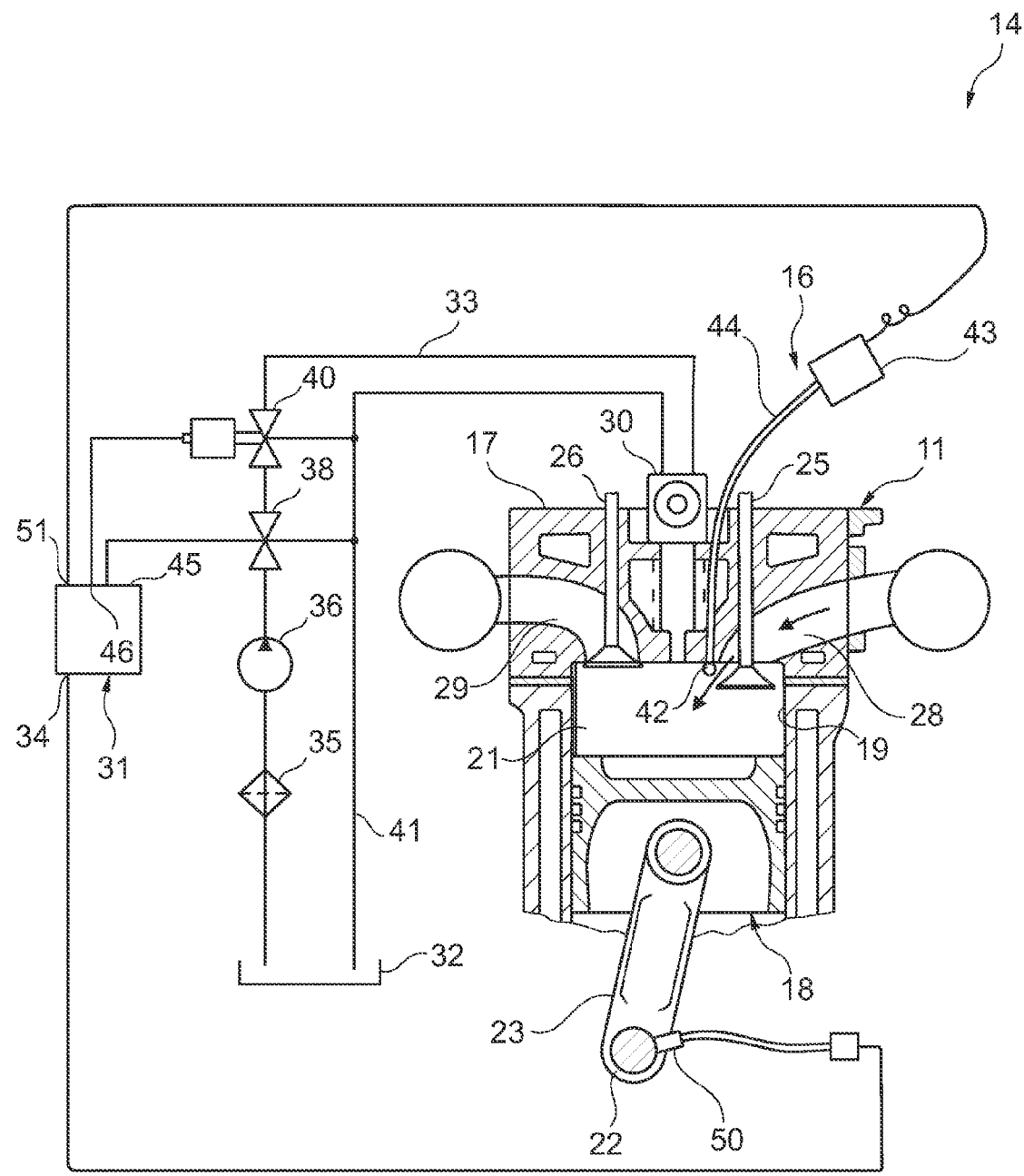
FIG. 9 illustrates a schematic view of the cylinder of FIG. 8.

FIG. 9 shows a schematic view of a cylinder assembly 14 that includes the cylinder 11 of FIG. 8. The cylinder 11 has a cylinder head 17. An in-cylinder pressure sensor 16 is installed in the cylinder head 17 whilst a piston 18 is slidably disposed in a bore 19 of the cylinder 11. The cylinder head 17, the piston 18, and the bore 19 define or surround a space that is called a combustion chamber 21.

The piston 18 is connected to a crankshaft 22 via a connecting rod 23. A position sensor 50 is attached to the crankshaft 22 whilst an output of the crankshaft position sensor 50 is connected to a port 34 of an electronic engine control unit 31.

Figure 10:
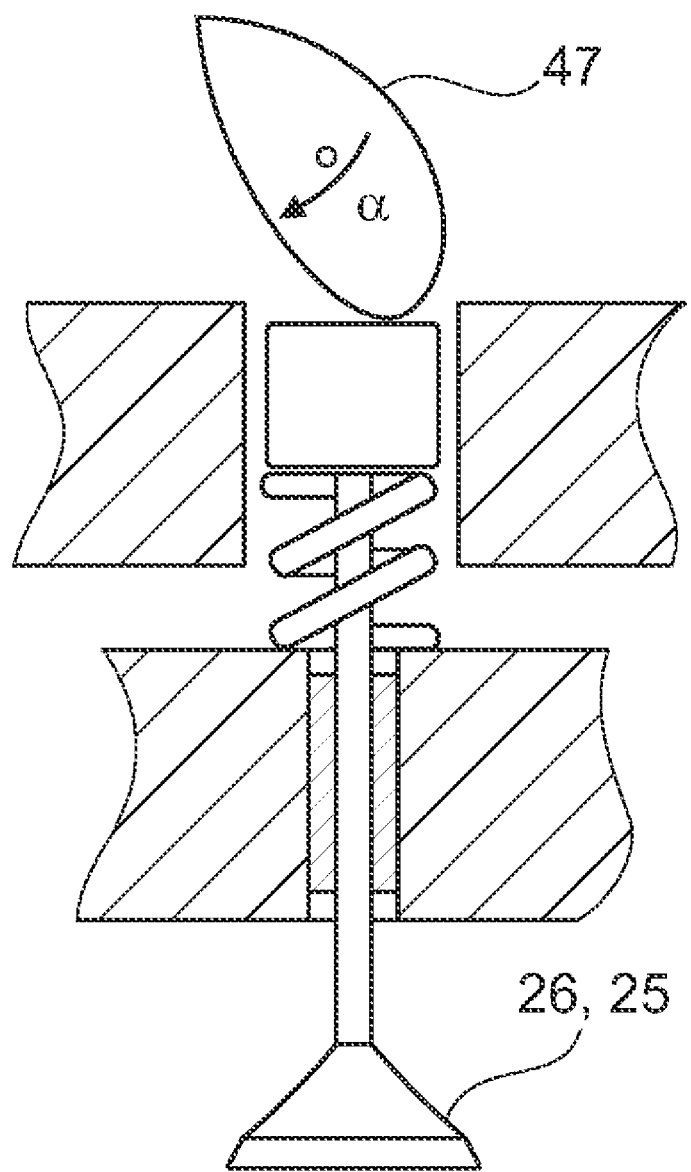
FIG. 10 illustrates a valve assembly of the cylinder of FIG. 8 and FIG. 9.

An inlet valve 25 is provided at an end of an intake passage 28 of the cylinder head 17 whilst an exhaust valve 26 is provided at an end of an exhaust passage 29 of the cylinder head 17. A fuel injector 30 is fixed to the cylinder head 17 such that an outlet of the fuel injector 30 is disposed in the combustion chamber 21. The inlet valve 25 and the exhaust valve 26 are placed next to camshafts 47 in a manner as shown in FIG. 10. A position of the camshaft 47 refers to its rotational angle $\alpha$ as shown in FIG. 10.

Referring to the fuel injection 30 of FIG. 9, it is connected to a fuel tank 32 via a supply line 33 that is also called a common rail. Disposed in line to the supply line 33 are a filter 35, a pump 36, a high-pressure valve 38, and a fuel-rail pressure regulator 40. The high-pressure valve 38 is connected to a port 45 of the engine control unit 31 whilst the fuel-rail pressure regulator 40 is connected a port 46 to the engine control unit 31. A return line 41 also leads from the fuel injector 30 to the tank 32.

Referring to the in-cylinder pressure sensor 16, it includes a sensor head 42 that is connected to a signal conditioner 43 via two cables 44. The sensor head 42 is located within the combustion chamber 21 whilst the signal conditioner 43 is located outside of the cylinder 11. An output of the signal conditioner 43 is connected to a port 51 of the engine control unit 31.

In a general sense, although the in-cylinder pressure sensor 16 is shown as being installed directly in the cylinder head 17, it could also be integrated into the fuel injector 30 or be integrated into a glow plug of the cylinder 11. The glow plug, which is not shown in the figure, can serve to heat the cylinder 11 to ease starting of the engine 10 from an idle state, especially when the engine 10 is cold.

Although the cylinder assembly 14 is intended for pressure ignition operation, it a broad sense, can include other parts for spark ignition operation. The cylinder assembly 14 can receive fuel or gas for its operation.

Functionally, the camshafts 47 are intended for actuating the valves 25 and 26. The actuation opens the inlet valve 25 to take in air or gases into the combustion chamber 21 or opens the exhaust valve 26 to exhaust the gases out of the combustion chamber 21. Put differently, the camshaft 47 modulates supply of the air to the combustion chamber 21 as well as modulates exhaust of combustion products from the combustion chamber 21.

The in-cylinder pressure sensor 16 measures pressure within the combustion chamber 21 and it sends the measured pressure readings to the engine control unit 31. The pressure sensor 16 is capable of withstanding heat and pressure associated with operation of the compression ignition engine 10 and is capable of operating in presence of volatile gases in the combustion chamber 21. Further, the pressure sensor 16 has a high sensitivity and a high signal-to-noise ratio. It is also immunes to electromagnetic interference and it produces linear readings within a certain tolerance.

The fuel injector 30 can be in the form of an electro-hydraulic fuel injector or in the form of a pressure-intensified accumulator-type injector. The fuel injector 30 is used to supply or to fill the combustion chamber 21 with diesel fuel or the like from the tank 32. The supply is controlled by the engine control unit 31 via the fuel-rail pressure regulator 40 and the high-pressure value 38.

The cylinder 18 is moved by the crankshaft 22 to change volume of the combustion chamber 21. The volume can be reduced to increase its pressure and temperature to ignite the fuel that is supplied by the fuel injector 30. The injected fuel ignites or burns at a particular temperature and pressure. The ignition, which is also called combustion, sends an explosive force onto the cylinder 18 to turn the crankshaft 22. The position or rotational angle of the crankshaft 22 is transmitted to the engine control unit 31 by the crankshaft position sensor 50.

The engine control unit 31 controls or governs the release of the fuel via the fuel-rail pressure regulator 40 and the high-pressure valve 38 to the combustion chamber 21. The control is based on information from the in-cylinder pressure sensor 16 and information from the crankshaft position sensor 50. The control can also use camshaft position information. This information is used to determine a state or phase of a combustion cycle of the engine 10.

Moreover, the engine control unit 31 can use other additional information of the engine 10 to control the fuel release. The additional information includes temperature, speed, or air intake volume of the engine 10. The control can also relate to timing, duration, or quantity of fuel release.

In a generic sense, the camshaft 47 can be removed from the engine 10 so that the valves 25 and 26 are not controlled or actuated by the camshaft 47 but by an electro-hydraulically means.

Figure 11:
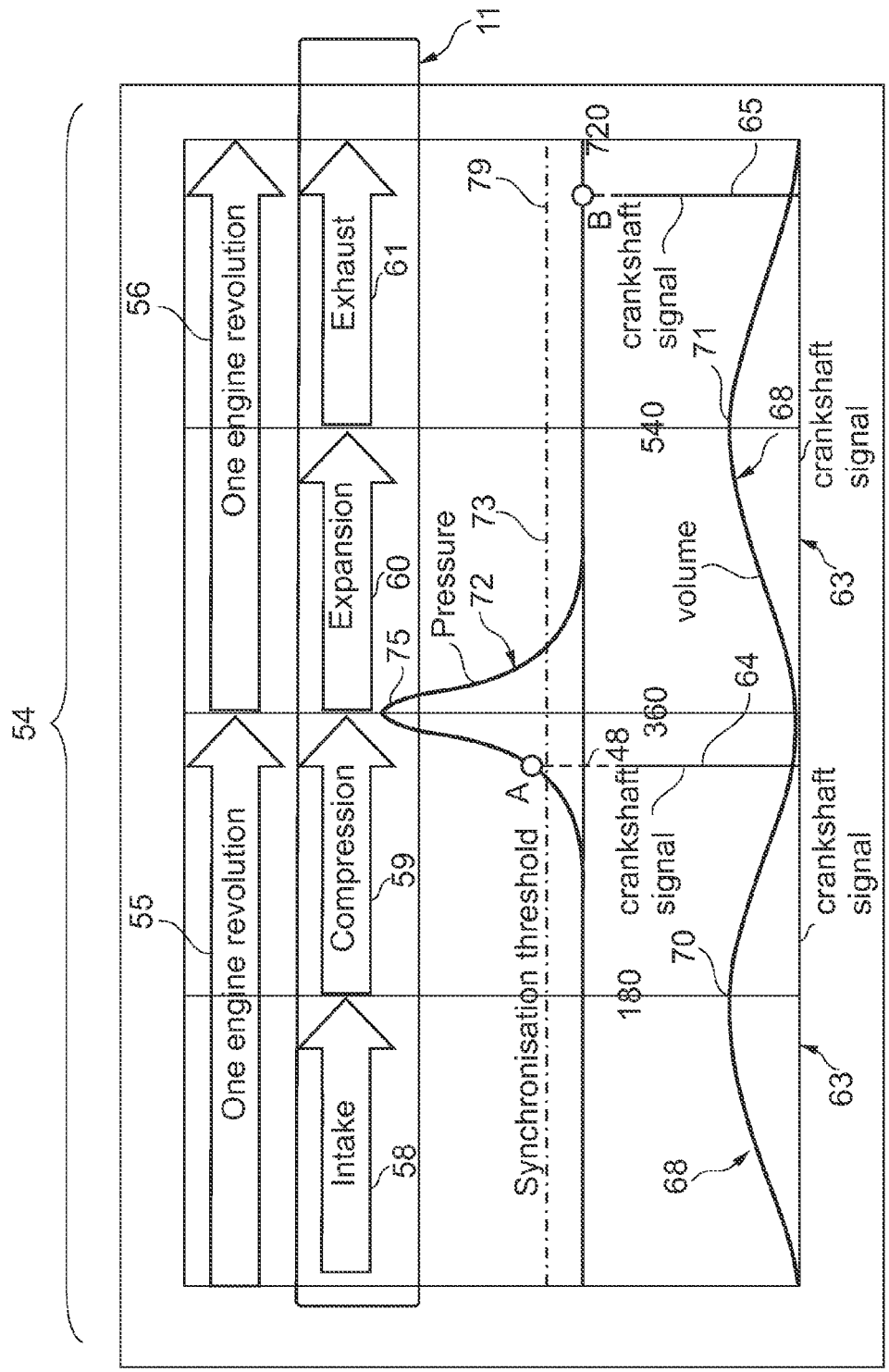
FIG. 11 illustrates a method of operating the cylinder of FIG. 8 and FIG. 9.

FIG. 11 shows graphs that illustrate a method of determining misfiring of the cylinder 11 of the engine 10. The method uses information from the in-cylinder pressure sensor 16 and engine cylinder phase or state information.

The cylinder phase information can be derived from crankshaft angular position information and from camshaft angular position information. In a broad sense, the engine phase information can be also be derived from other means. Without engine firing, pressure in the cylinder 11 increases always when its volume is decreased whilst its intake valve 25 and its exhaust valve 26 are closed.

As shown in FIG. 11, a full engine combustion cycle 54 comprises a first crankshaft revolution 55 and a second crankshaft revolution 56. The first crankshaft revolution 55 comprises an intake stroke 58 and a compression stroke 59 whilst the second crankshaft revolution 56 comprises an expansion stroke 60 and a compression stroke 61. The strokes 58, 59, 60, and 61 are also called a phase or a state. Each stroke 58, 59, 60, or 61 extends for 180 degrees rotation of the crankshaft 22.

The crankshaft position signal 63 has a first spike 64 and a second spike 65 that occurs in both the compression phase 59 and the exhaust 61.

Considering the combustion cycle 54, the intake stroke 58 starts at a 0-degree point of rotation of the crankshaft 22 and it ends at a 180-degree point. During this intake phase 58, the intake valve 25 is opened and the exhaust valve 26 is closed allowing gases or air to fill the combustion chamber 21. A volume graph 68 shows a volume of the combustion chamber 21 that increases throughout the intake phase 58 and that it reaches a first peak 70 at the end of the intake phase 58. A pressure graph 72 that depicts pressure within the combustion chamber 21 remains relatively constant throughout the phase.

The compression stroke 59 afterward commences at the 180-degree point of crankshaft rotation and ends a 360-degree point of crankshaft rotation. The intake valve 25 and the exhaust valve 26 are closed during this phase enclosing the gases within the combustion chamber 21. During this phase, the volume of the cylinder 11 decreases whilst its pressure increases and reaches at a peak 75 at the end of this compression phase 59. Correspondingly, temperature within the combustion chamber 21 also increases. Fuel is injected into the cylinder, as shown at point 48.

In-cylinder pressure is measured during this compression phase 59 to determine its polytrophic compression constant. The pressure is measured over a limited angular window of the crankshaft 22.

Then, the expansion stroke 60 starts at the 360-degree point of crankshaft rotation and it ends at a 540-degree point of crankshaft rotation. Due to the high temperature and the high pressure within the combustion chamber 21, the injected fuel ignites during this stroke 60. The intake valve 25 and the exhaust valve 26 are closed allowing the ignited fuel to exert a large force on the piston 18 and thereby turning the crankshaft 22 with the large force. As the crankshaft 22 turns, the volume of the combustion chamber 21 increases to reach a peak whilst the pressure of the combustion chamber 21 decreases rather quickly.

The in-cylinder pressure is again measured during this expansion phase 60 to determine its polytrophic expansion constant. The pressure is measured over a limited angular window of the crankshaft 22. The in-cylinder pressure is measured when the pressure is moderate. The pressure is moderate in the sense that the pressure is not measured during ignition or close to ignition when the in-cylinder pressure reaches a peak. In a general sense, the polytrophic constants are not determined or calculated during engine over-run, wherein a vehicle of the engine is moving with no throttle and the engine is acting as a brake. Based on the difference between the polytrophic expansion constant and the compression expansion constant, misfiring of the cylinder is then determined.

Later, the exhaust stroke commences at the 540-degree point and ends a 720-degree point. The intake valve 25 is closed and the exhaust valve 26 is opened allowing exhaust of the ignited fuel to leave the combustion chamber 21. The volume of the combustion chamber 21 starts to decrease whilst the pressure within the combustion chamber remains relatively constant throughout this stroke 61. The crankshaft signal 63 has the second spike 65 at 690-degree point of the exhaust stroke 61.

Figure 12:
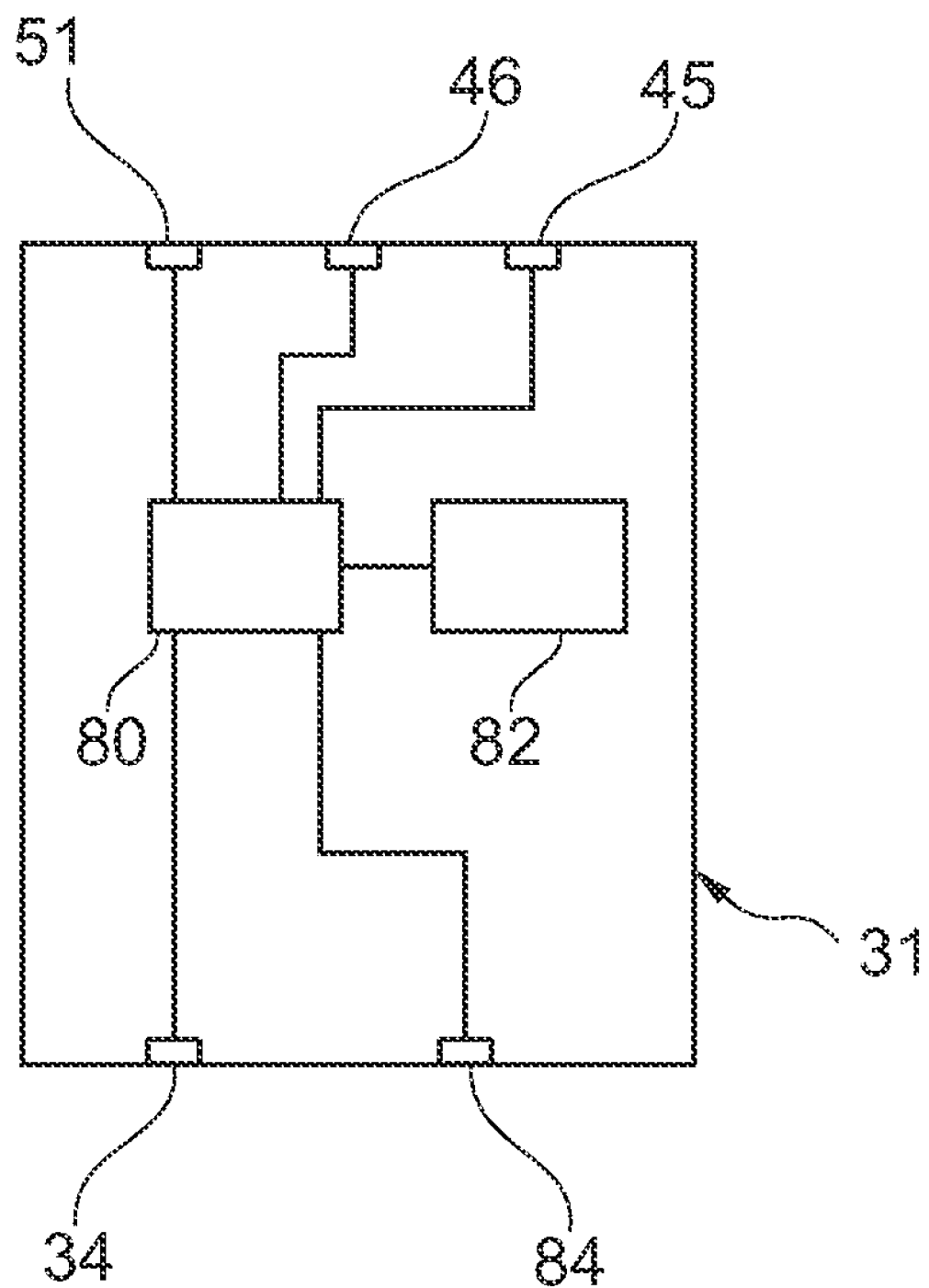
FIG. 12 illustrates an engine control unit for the cylinder of FIG. 8.

FIG. 12 shows the engine control unit 31 for the cylinder 11 of the engine 10 of FIG. 8.

The engine control unit 31 comprises a central processing unit 80 that is connected to a computer memory 82. The central processing unit 80 is connected to the ports 45, 46, 51, 34, and a port 84.

The central processing unit 80 receives information from the crankshaft position sensor 50 via the port 34 and in-cylinder pressure measurements from the in-cylinder pressure sensor 16 via the port 51. The pressure measurement is used to detect or to determine engine misfiring. Any detected misfiring is then used to adjust or control fuel injection to eliminate the misfiring. The adjustment can relate to quantity of the fuel injection and duration of the fuel injection.

In a special case, the port 34 receives information from a camshaft position sensor that is not shown in the figure. Then, the central processing unit 80 stores the crankshaft information, the camshaft information and the pressure measurements in the computer memory 82 for later processing by the central processing unit 80. The processing afterward uses the camshaft position information and the crankshaft position information to determine engine state or phase.

After this, the central processing unit 80 controls or releases the fuel injection using the high-pressure valve 38 via the port 45 and using the fuel-rail pressure regulator 40 via the port 46. The central processing unit 80 has electrical current drivers for the control that is not shown in the figure.

Figure 13:
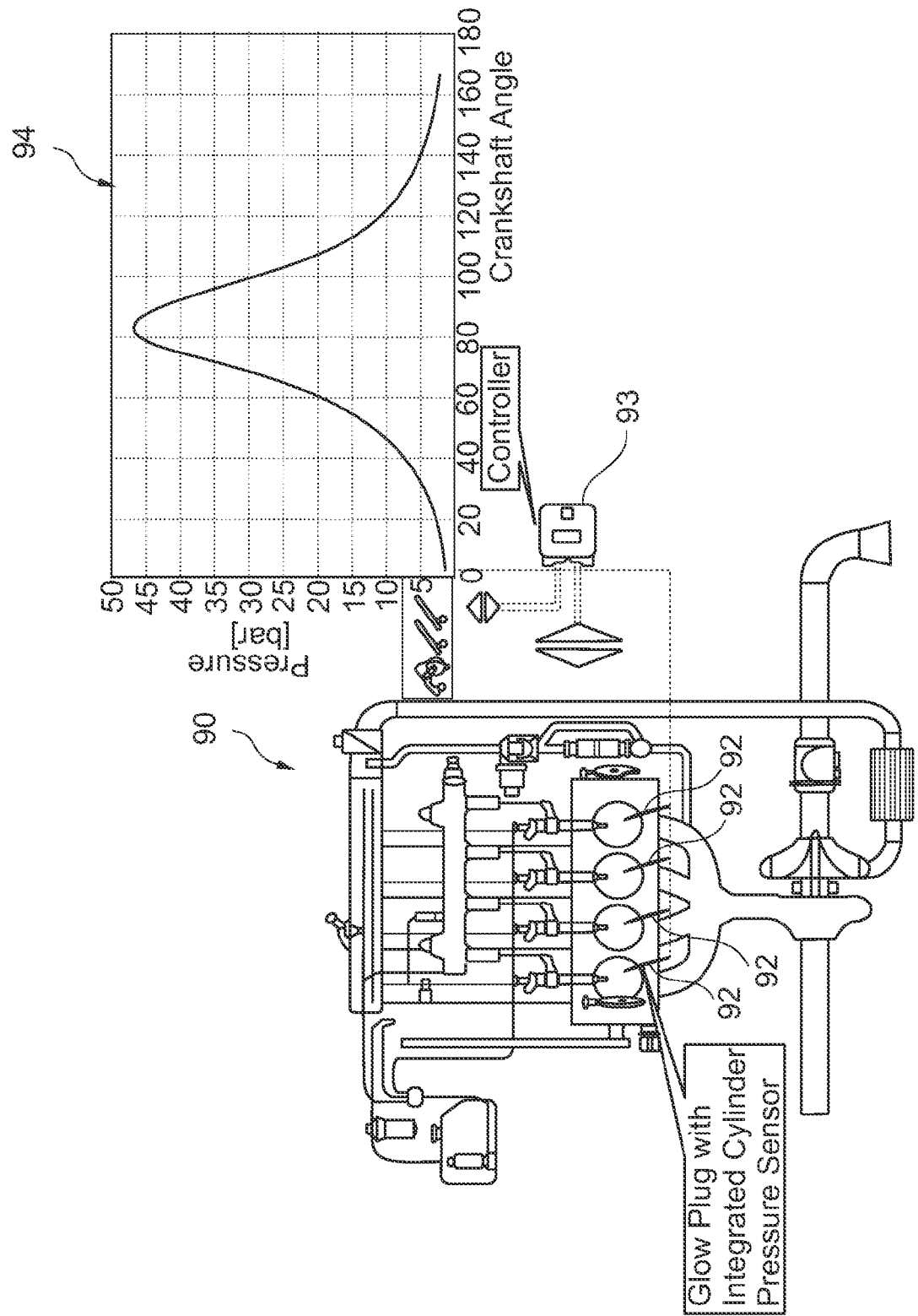
FIG. 13 illustrates a physical layout of a further engine that is equipped with an in-cylinder pressure sensor.

FIG. 13 shows a physical layout of a further engine 90 that is equipped with in-cylinder pressure sensors. The in-cylinder pressure sensors are integrated with glow plugs 92. In a generic sense, the engine 90 can have only one or more than one cylinder that is equipped with the pressure sensor.

FIG. 13 also has a graph 94 of in-cylinder pressure with respect to crankshaft angle. The in-cylinder pressure has a peak of about 47 bar when the crankshaft angle is about 93 degree.

A controller 93 of the engine 90 receives in-cylinder pressure measurements, crankshaft angle information and other information, as illustrated in the FIG. 13.

Although the above description contains much specificity, these should not be construed as limiting the scope of the embodiments but merely providing illustration of the foreseeable embodiments. Especially the above stated advantages of the embodiments should not be construed as limiting the scope of the embodiments but merely to explain possible achievements if the described embodiments are put into practice. Thus, the scope of the embodiments should be determined by the claims and their equivalents, rather than by the examples given.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method of controlling an internal combustion engine, comprising:
    measuring in-cylinder pressure of an expansion phase of a combustion cycle of a cylinder of the internal combustion engine;
    measuring in-cylinder pressure of a compression phase of the combustion cycle of the cylinder of the internal combustion engine,
    determining a difference between a polytrophic expansion phase constant and a polytrophic compression phase constant of the cylinder of the internal combustion engine using the measured expansion phase pressure and the measured compression phase pressure; and
    detecting a misfiring of the cylinder using the determined difference.

2. The method of claim 1 wherein the misfiring is deemed to occur when the determined difference is smaller than a predetermined value.

3. The method of claim 1, wherein the expansion phase pressure and the compression phase pressure are measured over a pre-determined angular window when the in-cylinder pressure is moderate.

4. The method of claim 1, further comprising controlling the internal combustion engine using the detected misfiring to eliminate the detected misfiring.

5. The method of claim 4, wherein the controlling of the internal combustion engine comprises adjusting opening and closing of a fuel injector of the cylinder.

6. An engine control unit, comprising:
    a port for receiving an in-cylinder pressure measurement of a cylinder of an internal combustion engine;
    a storage unit for storing the in-cylinder pressure measurement of an expansion phase and the in-cylinder pressure measurement of a compression phase of a combustion cycle of the cylinder of the internal combustion engine; and
    a misfiring detection unit for determining a difference between a polytrophic expansion phase constant and a polytrophic compression phase constant using the expansion phase pressure measurement and the compression phase pressure measurement.

7. The engine control unit of claim 6, wherein the engine control unit further comprises a port for receiving engine phase information of the combustion cycle of the cylinder of the internal combustion engine.

8. The engine control unit claim 6, further comprising a cylinder control unit for controlling a run-time parameter unit of the cylinder of the internal combustion engine using the detected engine misfiring.

9. The engine control unit of claim 8, wherein the run-time parameter comprises a timing of fuel injection.

10. The engine control unit of claim 8, further comprising a port for receiving at least one engine parameter wherein the at least one engine parameter is used by the cylinder control unit for adjusting the run-time parameter.

11. An internal combustion engine, comprising:
    a fuel line;
    a valve of the fuel line;
    an engine control unit that is adapted to control a fuel injection the valve of the fuel line, the engine control unit comprising:
        a port for receiving an in-cylinder pressure measurement of a cylinder of an internal combustion engine;
        a storage unit for storing the in-cylinder pressure measurement of an expansion phase and the in-cylinder pressure measurement of a compression phase of a combustion cycle of the cylinder of the internal combustion engine; and
        a misfiring detection unit for determining a difference between a polytrophic expansion phase constant and a polytrophic compression phase constant using the expansion phase pressure measurement and the compression phase pressure measurement.

12. The internal combustion engine of claim 11, wherein the engine control unit is adapted to control the fuel injection using a fuel-rail pressure regulator of the fuel line.

13. The internal combustion engine of claim 11, wherein the engine control unit further comprises a port for receiving engine phase information of the combustion cycle of the cylinder of the internal combustion engine.

14. The internal combustion engine of claim 11, further comprising a cylinder control unit for controlling a run-time parameter unit of the cylinder of the internal combustion engine using the detected engine misfiring.

15. The internal combustion engine of claim 14, wherein the run-time parameter comprises a timing of fuel injection.

16. The internal combustion engine of claim 14, further comprising a port for receiving at least one engine parameter wherein the at least one engine parameter is used by the cylinder control unit for adjusting the run-time parameter.

17. A vehicle, comprising:
    a wheel;
    a transmission unit;
    an internal combustion engine connected to the wheel via the transmission, the internal combustion engine comprising:
        a fuel line;
        a valve of the fuel line;
        an engine control unit that is adapted to control a fuel injection the valve of the fuel line, the engine control unit comprising:
            a port for receiving an in-cylinder pressure measurement of a cylinder of an internal combustion engine;
            a storage unit for storing the in-cylinder pressure measurement of an expansion phase and the in-cylinder pressure measurement of a compression phase of a combustion cycle of the cylinder of the internal combustion engine; and a misfiring detection unit for determining a difference between a polytrophic expansion phase constant and a polytrophic compression phase constant using the expansion phase pressure measurement and the compression phase pressure measurement.

18. The vehicle of claim 17, wherein the engine control unit is adapted to control the fuel injection using a fuel-rail pressure regulator of the fuel line.

19. The vehicle of claim 17, wherein the engine control unit further comprises a port for receiving engine phase information of the combustion cycle of the cylinder of the internal combustion engine.

20. The vehicle of claim 17, further comprising a cylinder control unit for controlling a run-time parameter unit of the cylinder of the internal combustion engine using the detected engine misfiring.

21. The vehicle of claim 20, wherein the run-time parameter comprises a timing of fuel injection.

22. The vehicle of claim 20, further comprising a port for receiving at least one engine parameter wherein the at least one engine parameter is used by the cylinder control unit for adjusting the run-time parameter.

* * * * *